US008588676B1

(12) United States Patent
Prelec (10) Patent No.: US 8,588,676 B1
(45) Date of Patent: Nov. 19, 2013

(54) BAYESIAN TRUTH SERUM (76) Inventor: Dražen Prelec, Cambridge, MA (US)

(*) Notice: Subject to any disclaimer, the term of this patent is extended or adjusted under 35 U.S.C. 154(b) by 1703 days.

(21) Appl. No.: 11/539,480

(22) Filed: Oct. 6, 2006

Related U.S. Application Data (60) Provisional application No. 60/724,047, filed on Oct. 6, 2005.

(51) Int. Cl.
*G09B 7/00* (2006.01)
(52) U.S. Cl.
USPC ............................................. 434/353
(58) Field of Classification Search
USPC ............... 434/322, 323, 350, 365; 705/10
See application file for complete search history.

(56) References Cited

U.S. PATENT DOCUMENTS

| | | | | |
|---|---|---|---|---|
| 6,513,014 B1 * | 1/2003 | Walker et al. | ................... | 705/10 |
| 7,238,025 B1 * | 7/2007 | Wilkerson et al. | ............ | 434/236 |
| 7,632,101 B2 * | 12/2009 | Braunberger et al. | ........ | 434/322 |

OTHER PUBLICATIONS

Answers.com. Who wants to be a Millionaire CD-ROM [online]., 1999 [retrieved on Jan. 16, 2011]. Retrieved from the Internet:<URL:http://www.answers.com/topic/who-wants-to-be-a-millionaire-cd-rom>5 pages.*
McKee, Maggie. Mathematical "truth serum" promotes honesty. Oct. 14, 2004 [retrieved on Dec. 2, 2011]. Retrieved from the Internet:<URL:http://www.newscientist.com/article/dn6535-mathematical-truth-serum-promotes-honesty.html>., pp. 1-3.*

* cited by examiner

*Primary Examiner* — Kesha Frisby
(74) *Attorney, Agent, or Firm* — Mintz Levin Cohn Ferris Glovsky and Popeo, P.C.

(57) ABSTRACT

A method of gathering information from respondents, the method including posing a primary question to the respondents, receiving primary question answers from the respondents, posing a secondary question to at least a sub-portion of the respondents, the secondary question corresponding to the primary question, receiving secondary question answers from the respondents, and scoring a primary question answer received from a selected respondent as a function of i) the primary question answer received from the selected respondent and ii) answers to the primary and secondary questions received from the respondents.

25 Claims, 6 Drawing Sheets

BAYESIAN TRUTH SERUM

CROSS-REFERENCE TO RELATED ACTIONS

This application claims the benefit of U.S. Provisional Application No. 60/724,047, filed Oct. 6, 2005.

BACKGROUND

Individuals, companies, and/or government agencies often collect information from various groups of people. Information gathering techniques typically include surveys, personality questionnaires, one-on-one interviews, focus groups, and/or other forms. The type of information collected can vary depending on the goals. Each information gathering technique also has many variants. For example, questionnaires can be administered by telephone, mail, on-line, personal in-home, and personal-intercept (e.g., in a mall). Each variant, however, can have advantages and disadvantages. Often there is little or no incentive for respondents to tell the truth. While compensation for participation is typically used, the amount of compensation does not depend on the truthfulness or quality of the respondent's answers. Whether or not the respondent is telling the truth can affect the value of results obtained by the information gatherer. The value is reduced, for example, if respondents provide careless, inauthenic (e.g., praise-seeking), or dishonest answers.

SUMMARY

In general, in an aspect, the invention provides a method of gathering information from respondents, the method including posing a primary question to the respondents, receiving primary question answers from the respondents, posing a secondary question to at least a sub-portion of the respondents, the secondary question corresponding to the primary question, receiving secondary question answers from the respondents, and scoring a primary question answer received from a selected respondent as a function of i) the primary question answer received from the selected respondent and ii) answers to the primary and secondary questions received from the respondents.

Implementations of the invention may include one or more of the following features. The primary question includes multiple answer choices and the secondary question prompts each of the respondents to provide a prediction indicative of a distribution of responses to the primary question. The secondary question prompts the respondents to provide a prediction indicative a percentage of the respondents that will choose each of the plurality of answer choices. The method further includes scoring the prediction for accuracy compared to the actual distribution. Scoring the primary question answer includes computing an information score corresponding to each of the plurality of answer choices according to $$\ln\frac{\bar{x}_k}{\bar{y}_k},$$

where $$\bar{x}_k = \frac{1}{n}\sum_{r=1}^{n} I(x^r = k),$$

where $$\bar{y}_k = e\left\{\frac{1}{n}\sum_{r=1}^{n} \ln y_k^r\right\},$$

and where n is a quantity of the respondents, k is an integer representative of a selected one of the answer choices, m is a quantity of the plurality of answer choices, $r \in \{1, 2, \ldots, n\}$ and are individual respondents labeled by number, $x^r \in \{1, \ldots, m\}$ is the primary question answer endorsed by respondent r, and $y^r = (y_1^r, \ldots, y_m^r)$, $(y_k^s \geq 0, \Sigma_k y_k^s = 1)$ is the secondary question answer of respondent r, and $I(\bullet)$ is a zero-one indicator function indicative of whether a condition is satisfied.

Implementations of the invention may also include one or more of the following features. The method further includes calculating a combined primary and secondary answer score corresponding to the selected respondent's primary and secondary question answers according to $$\left(\ln\frac{\bar{x}_j}{\bar{y}_j}\right) + \alpha\left(\sum_{k=1}^{m} \bar{x}_k \ln\frac{y_k^r}{\bar{x}_k}\right),$$

where $(x^r = j, y^r)$, $0 \leq \alpha \leq 1$, and j is indicative of which one of the plurality of answer choices is chosen by the selected respondent. Scoring the primary answer further includes calculating a combined primary and secondary answer score corresponding to the selected respondent's primary question answer according to $$\sum_{s \neq r} \ln\frac{\bar{x}_j^{-rs}}{\bar{y}_j^{-rs}} + \alpha \sum_{s \neq r}\sum_k \bar{x}_k^{-rs} \ln\frac{y_k^r}{\bar{x}_k^{-rs}},$$

where $$\bar{x}_k^{-rs} = \frac{1}{n+m-2}\left(1 + \sum_{q \neq r,s} I(x^q = k)\right),$$

where $$\bar{y}_k^{-rs} = e\left\{\frac{1}{n-2}\sum_{q \neq r,s} \ln y_k^q\right\},$$

where $0 \leq \alpha \leq 1$. The combined primary and secondary answer score is calculated using $$\sum_{s \neq r} \ln\frac{\bar{x}_j^{-rs}}{\bar{y}_j^{-rs}} + \alpha \sum_{s \neq r}\sum_k \bar{x}_k^{-rs} \ln\frac{y_k^r}{\bar{x}_k^{-rs}}$$

only if a quantity of the respondents is less than a threshold. The combined primary and secondary answer score is calculated using $$\sum_{s \neq r} \ln\frac{\bar{x}_j^{-rs}}{\bar{y}_j^{-rs}} + \alpha \sum_{s \neq r}\sum_k \bar{x}_k^{-rs} \ln\frac{y_k^r}{\bar{x}_k^{-rs}}$$

only if none of the respondents selected at least one of the answer choices. Scoring the primary question answer includes using a truth-assessing scoring algorithm. The primary question is authored by another respondent.

In general, in another aspect, the invention provides a computer program product residing on a computer-readable medium and including computer-readable instructions configured to cause a computer to pose a primary question to respondents, receive primary question answers from the respondents, pose a secondary question to at least a subportion of the respondents, the secondary question corresponding to the primary question, receive secondary question answers from the respondents, and score a primary question answer received from a selected respondent as a function of i) the primary question answer received from the selected respondent and ii) answers to the primary and secondary questions received from the respondents.

Implementations of the invention may provide one or more of the following features. The computer-readable instructions are further configured such that the primary question includes a plurality of answer choices and the secondary question prompts each of the respondents to provide a prediction indicative of a distribution of responses to the primary question. The computer-readable instructions are further configured such that the secondary question prompts the respondents to provide a prediction indicative a percentage of respondents that will choose each of the plurality of answer choices. The computer-readable instructions are further configured to cause the computer to score the prediction for accuracy. The computer-readable instructions are further configured to cause the computer to compute an information score corresponding to each of the plurality of answer choices according to $$\ln \frac{\bar{x}_k}{\bar{y}_k},$$

where $$\bar{x}_k = \frac{1}{n}\sum_{r=1}^{n} I(x^r = k),$$

where $$\bar{y}_k = e\left\{\frac{1}{n}\sum_{r=1}^{n} \ln y_k^r\right\},$$

and where n is a quantity of the respondents, k is an integer representative of a selected one of the answer choices, m is a quantity of the plurality of answer choices, $r \in \{1, 2, \ldots, n\}$ are individual respondents labeled by number, $x^r \in \{1, \ldots, m\}$ is the primary answer endorsed by respondent r, and $y^r = (y_1^r, \ldots, y_m^r)$ is the secondary question answer of respondent r, $(y_k^s > 0, \Sigma_k y_k^s = 1)$, and $I(\bullet)$ is a zero-one indicator function indicative of whether a condition is satisfied.

Implementations of the invention may also provide one or more of the following features. The computer-readable instructions are further configured to cause the computer to compute a combined primary and secondary answer score according to $$\left(\ln \frac{\bar{x}_j}{\bar{y}_j}\right) + \alpha \left(\sum_{k=1}^{m} \bar{x}_k \ln \frac{y_k^r}{\bar{x}_k}\right),$$

where $(x^r = j, y^r)$, $0 \le \alpha \le 1$, and j is indicative of which one of the plurality of answer choices is chosen by the selected respondent. The computer-readable instructions are further configured to cause the computer to compute an information score corresponding to each of the plurality of answer choices according to $$\sum_{s \ne r} \ln \frac{\bar{x}_j^{-rs}}{\bar{y}_j^{-rs}},$$

where $$\bar{x}_k^{-rs} = \frac{1}{n+m-2}\left(1 + \sum_{q \ne r,s} I(x^q = k)\right),$$

where $$\bar{y}_k^{-rs} = e\left\{\frac{1}{n-2}\sum_{q \ne r,s} \ln y_k^q\right\},$$

where $0 \le \alpha \le 1$. The computer-readable instructions are further configured to cause the computer to compute the combined primary and secondary answer score using $$\sum_{s \ne r} \ln \frac{\bar{x}_j^{-rs}}{\bar{y}_j^{-rs}} + \alpha \sum_{s \ne r} \sum_{k} \bar{x}_k^{-rs} \ln \frac{y_k^r}{\bar{x}_k^{-rs}}$$

only if a quantity of the respondents is less than a threshold. The computer-readable instructions are further configured to cause the computer to compute the combined primary and secondary answer score using $$\sum_{s \ne r} \ln \frac{\bar{x}_j^{-rs}}{\bar{y}_j^{-rs}} + \alpha \sum_{s \ne r} \sum_{k} \bar{x}_k^{-rs} \ln \frac{y_k^r}{\bar{x}_k^{-rs}}$$

only if a none of the respondents selected at least one of the answer choices. The computer-readable instructions are further configured to cause the computer to score the primary question answer using a truth-assessing scoring algorithm. The computer-readable instructions are further configured to cause the computer to prompt another of the respondents to author the primary question.

In general, in another aspect, the invention provides a questionnaire for use with a population of respondents, the questionnaire including a question set including, a primary question portion containing a primary question, a primary question answer portion including a plurality of answer choices to the primary question, a secondary question portion containing a secondary question corresponding to the primary question; and a secondary question answer portion, wherein the secondary question prompts a respondent to provide an estimation of how other respondents in the population will answer the primary question. Implementations of the invention may also provide means for scoring an answer provided by the respondent in response to the primary question.

Various aspects of the invention may provide one or more of the following capabilities. For example, higher quality information can be obtained compared to prior information gathering methods. Motivation for respondents to provide quality and/or useful information can be increased compared to prior methods. The likelihood that a respondent will give an answer that is self-interested (e.g., makes the respondent look good or knowledgeable) can be reduced compared to prior methods. The likelihood that a respondent will give an answer that is perceived as being "desired" by the client (e.g., telling a product manufacturer that the respondent likes the client's product) can be reduced compared to prior methods. Higher and more uniform levels of attention and effort during the information-elicitation process can be obtained when compared to prior methods. Motivation to give less than fully honest answers can be reduced. Recruitment of respondents with specific expertise can be facilitated. Respondents that have conscientiously prepared (e.g., by reviewing a homework assignment, reading instructional materials, and/or trying out a product or a service) can be more efficiently rewarded as compared to prior methods. Respondents can be more efficiently taught how to improve the quality of the information provided as compared to prior methods. "Superior respondents" can more efficiently be identified (e.g., those respondents whose opinions can be given more weight, and/or retained for future studies) as compared to prior methods.

Still other capabilities relative to prior methods can be obtained. More accurate estimates of future events (e.g., interest rates reaching a certain level, probability of success of new technologies or products, probabilities assigned to political events, and/or environmental scenarios (e.g., global warming)) can be obtained. "True" responses by respondents can be induced without understanding the probabilistic relationship between the possible answers to a question. A more "one-size-fits-all" scoring algorithm, which does not use prior probabilities, or require statistical input from the client, can be used. The client can modify questions without calculating additional prior probabilities of the answer choices. Questions can be completely novel and can include questions for which empirically estimated base rates or probabilities are not available. Full natural language resources can be used to tailor a new set of questions for each application. The same questions can be applied to different populations. Surveys can be conducted in informationally dynamic settings (e.g., political and/or financial forecasting). Novel and/or unique questions can be used by a client and/or researcher who is a complete outsider to the domain. The client and/or researcher can reward respondents for truth telling even though client or researcher lacks any independent knowledge of what the true answer is.

These and other capabilities of the invention, along with the invention itself, will be more fully understood after a review of the following figures, detailed description, and claims.

DETAILED DESCRIPTION

Embodiments of the invention provide techniques for obtaining a score that is indicative of a likelihood that a respondent is giving a personally truthful answer to a question. For example, a client (e.g., an entity commissioning a survey) presents a survey to a population of respondents. The survey includes primary questions about a subject of interest to the client (e.g., how likely are you to buy product X?), to which each respondent provides an answer. Each primary question has a corresponding secondary question prompting each respondent to provide an expected probability distribution that other respondents in the population will pick specific answers to the primary question (e.g., "What percentage of people do you feel will answer 'Yes' and what percentage of people do you feel will answer 'No'?"). For each primary question answered by each respondent, a score is determined that is indicative of a likelihood that the respondent provided a personally truthful answer to the question. A personally truthful answer is preferably honest and can also reflect conscientious attention to the question (e.g., reflects mental effort in comprehending the question and considering the possible answers). For example, answers are scored for being "surprisingly common," e.g., more common than collectively predicted. The score accorded to a respondent's primary question answer is a function of the respondent's primary question answer, the respondent's secondary question answer, and how other respondents in the population answered the same questions. Other embodiments are within the scope of the invention.

The Bayesian Truth Serum ("BTS") is a technique that can obtain "superior quality" information (e.g., information that a respondent personally believes to be true) from respondents (e.g., in focus groups, market research surveys, opinion research surveys, online surveys, and/or expert evaluation settings). Superior quality information can be used, for example, to better design new products, better forecast election results, or better gauge future events (e.g., prices, interest rates, etc.). The BTS technique can transform the information elicitation process into a contest/game in which respondents compete against each other by providing answers that are believed to receive a high score, which can further increase the quality of the received information. For example, the BTS technique can provide respondents with incentives for providing truthful and carefully considered answers to survey questions (e.g., the BTS technique can provide financial and/or reputational incentives).

The BTS technique is preferably carried out such that it rewards truthful (e.g., honest and careful) answers by respondents. For example, the BTS technique can be carried out such that truth-telling increases the likelihood of a high information score and prediction score on the assumption that others are responding truthfully (e.g., truth telling is formally a Nash equilibrium). The BTS technique is preferably carried out such that if one respondent has more information than another respondent (e.g., the more informed respondent can replicate the statistical properties of the opinions held by the less informed respondent by applying a randomization device to the more informed respondent's own opinions) then the more informed respondent can expect to receive a higher score from the BTS technique. Furthermore, the BTS technique is preferably carried out such that if one respondent has more information than another respondent does (e.g., the more informed respondent is less surprised (e.g., places greater probability) than the less informed respondent by the actual distribution of answers of all respondents), then the more informed respondent will receive a higher score from the BTS technique.

While the description herein focuses on implementing the BTS technique using a computerized system, the BTS technique can be implemented using various approaches. For example, the BTS technique can be implemented using electronic and/or online surveys, in-person surveys, telephone surveys, and/or paper surveys. The BTS technique can also be implemented in the context of a focus-group discussion, with respondents seated around a table, entering their answers into a laptop. The BTS technique can be set up as an online game, with respondents participating for the pleasure of the competition, and/or in order to find out something more about the respondents' abilities and knowledge. Surveys can be presented in one form, and responses provided using a different form (e.g., questions can be presented via a computer and responses provided via the mail). The scoring process can be completed by the computer, and/or by hand. The method used to implement the BTS technique does not have be uniform across a population (e.g., a portion of the population can be surveyed using a computer, and another portion can be surveyed using a telephone). The use of a computerized system, however, can increase the "fun level" of a BTS application. Furthermore, variations of the computerized system described herein are possible.

Figure 1:
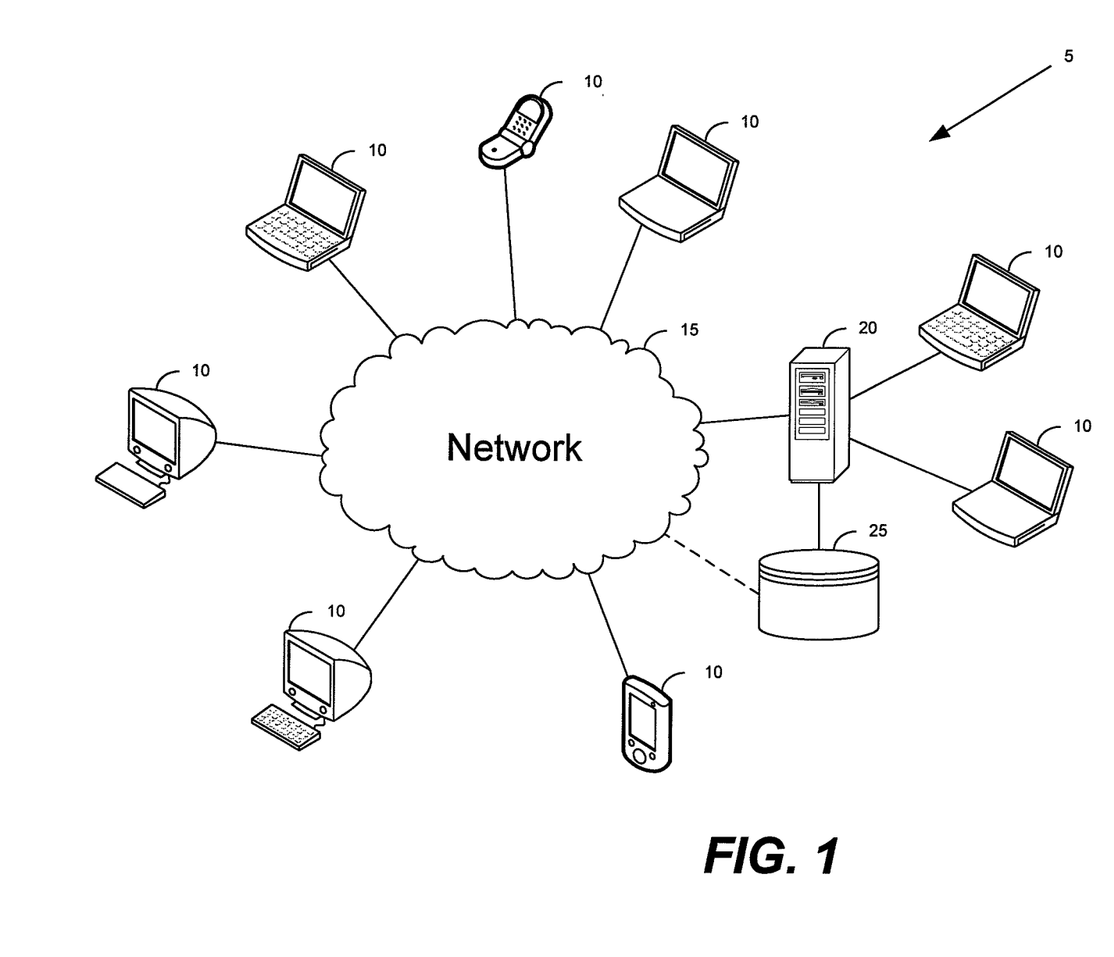
FIG. 1 is a block diagram of a computerized system configured to implement the invention.

Referring to FIG. 1, a system 5 includes computer systems 10, a network 15, a server 20, and a database 25. The network 15 is configured to interconnect the computer systems 10, the server 20, and optionally the database 25. The network 15 is, for example, a local area network (LAN) and/or the Internet. The server 20 is coupled to the database 25 and is configured to coordinate the information gathering (e.g., to provide questions to, and receive responses from respective respondents at each of the computer systems 10). The server 20 is configured to, for example, provide a web-based interface allowing respondents to participate in a survey. The server 20 is configured to retrieve questions from, and store responses in, the database 25. The server 20 can also retrieve questions from a memory contained within the server 20, and can generate questions in real-time. While the database 25 is shown as being coupled to the server 20, other configurations are possible, e.g., the database 25 can be coupled to the network 15, or omitted from the system 5. Furthermore, while the server 20 has been described as being responsible for coordinating the information gathering, other configurations of the system 5 are possible (e.g., the server 20 can be omitted and one of the computer systems 10 can function as the server 20, etc.).

Figure 2:
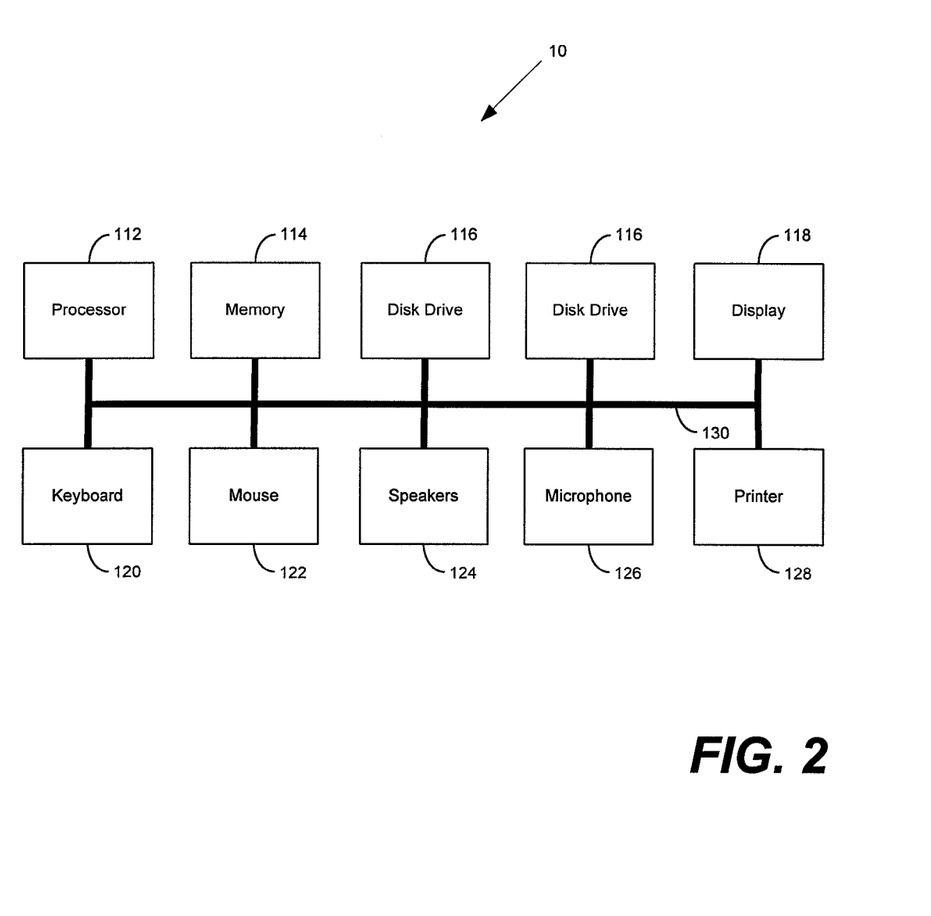
FIG. 2 is a block diagram of a computer system shown in FIG. 1.

Referring to FIG. 2, the computer system 10 includes a processor 112, memory 114, disk drives 116, a display 118, a keyboard 120, a mouse 122, speakers 124, a microphone 126, and a printer 128. The processor 112 can be a personal computer central processing unit (CPU) such as those made by Intel® Corporation. The memory 114 includes memory such as random access memory (RAM) and read-only memory (ROM). The disk drives 116 include, for example, hard-disk drives, floppy-disk drives, CD-ROM drives, DVD+/–R drives, and/or zip drives. The display 118 is a cathode-ray tube (CRT), although other forms of displays are acceptable, e.g., liquid-crystal displays (LCD) including TFT displays. The keyboard 120 and mouse 122 can provide data input mechanisms for a respondent (not shown). The speakers 124 can produce audio output for the respondent and the microphone can receive sounds, e.g., speech from the respondent. The printer 128 is a printer such as a laser printer, or an ink-jet printer, and can provide printouts to the respondent. The components 112, 114, 116, 118, 120, 122, 124, and 126 are connected by a connection 130. The computer system 10 can store, for example, in the memory 114, software code containing computer-readable, computer-executable code/instructions for causing the computer system 10 to perform functions described herein. While the computer system has been described as including a processor 112, memory 114, disk drives 116, a display 118, a keyboard 120, a mouse 122, a speakers 124, a microphone 126, and a printer 128, one or more of the components can be omitted. For example, the computer system 10 can be a PC, a mobile phone, a BlackBerry®, a PDA, a fax machine, a computer enabled kiosk, etc. Furthermore, while the connection 130 is shown as a single bus, other configurations are possible (e.g., the processor 112 is coupled to the printer 128 via a USB connection.)

Figure 3:
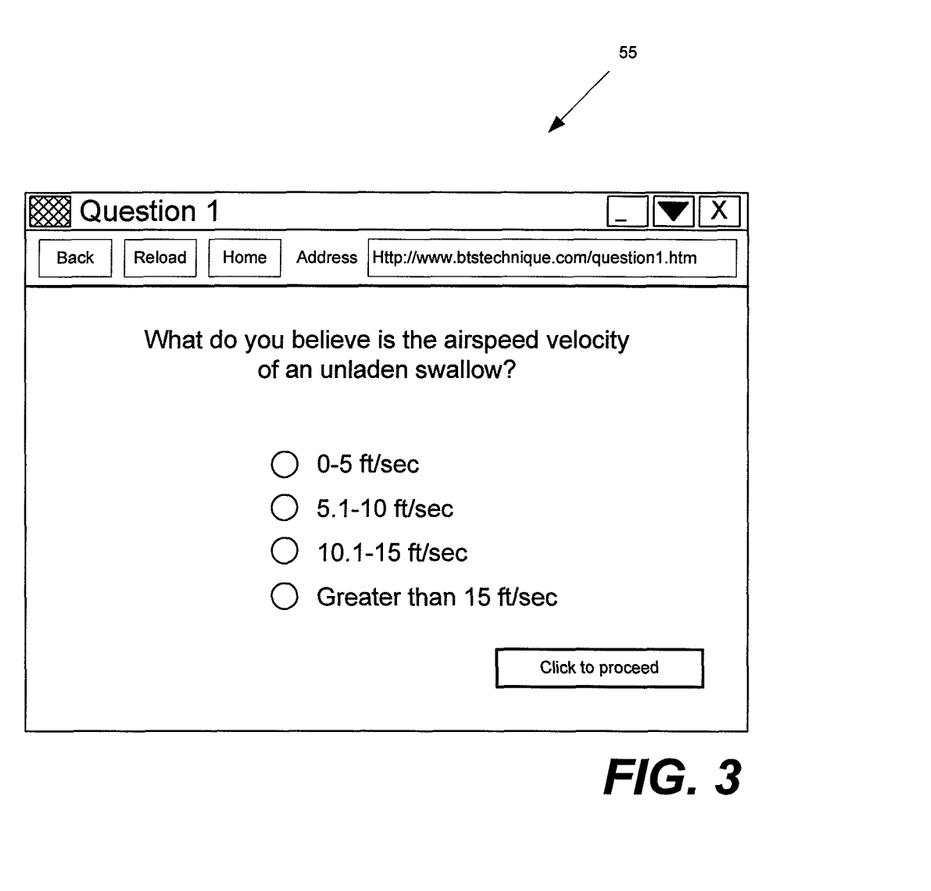
FIG. 3 is a screen shot of a primary question being presented to a respondent.

Referring to FIGS. 1-2, the server 20 is configured to provide questions to the computer system 10, which is configured to present the questions to respondents. One or more questions are presented to the respondents using human-interface devices such as the display 118, the speakers 124, and the printer 128. For example, the computer system 10 is configured to provide the survey via a web-based interface (e.g., the screen shot 55 shown in FIG. 3), via an e-mail, via an interactive chat session, via spoken questions, etc. The computer system 10 is preferably configured to provide the same set of questions to all respondents participating in the survey. The individual questions can be provided in a variety of ways, e.g., such that multiple respondents must all answer the same question prior to being provided with another question, or such that respondents can answer the questions at their leisure.

The system 5 is configured to implement the BTS technique by presenting multiple types of questions to the respondents. One type of question is a primary question (e.g., What is your favorite color?) and another is a secondary question (e.g., What percentage of respondents will pick "blue," "green," and "red," respectively?). Thus, a complete survey preferably consists of a series of primary questions, and a corresponding series of secondary questions. Preferably, the secondary questions are interleaved with the primary questions, although this is not required. The primary questions can be authored by one or more sources depending on whether the survey is interactive or non-interactive. For example, in a non-interactive survey, the client can create a complete set of questions in advance. In an interactive survey, the client and/or respondents can create questions in real-time as the survey progresses. It is also possible to present the secondary question to only a sub-portion of the respondents.

The BTS technique is designed such that the primary questions can be authored using a wide range of question types and relating to various topics. The primary questions can be, for example, multiple choice, open ended, and/or dichotomous. Unique questions can be developed for each population and/or the same questions can be used to gather information from multiple populations. The questions are not restricted to a pre-tested question set for which empirically estimated base rates and/or probabilities are available. New questions can be created using full natural language resources. Example primary questions are shown in Table 1.

TABLE 1

| Sample questions |
| --- |
| [Respondent is shown a photograph of a car] |
| If you had an opportunity to purchase the concept vehicle (as shown in the photograph) sometime in the next year for a price of $25,000, would you: |
|     (a) Definitely purchase |
|     (b) Probably purchase |
|     (c) Probably not purchase |
|     (d) Definitely not purchase |
| What is your probability estimate that we will have an essentially free energy source by the year 2100? |
| (i.e., using a one hundred point probability scale) |
| Will you vote in the next presidential elections? |
|     (a) Definitely |

TABLE 1-continued

Sample questions (b) Probably
(c) Probably not
(d) Definitely not
Have you had more than 20 sexual partners over the past 12 months?
(Yes / No)
Is Radiohead your favorite rock band? (Yes / No)

The system 5 further implements the BTS technique by prompting the respondents to answer secondary questions pertaining to each of the primary questions. The server 20 is configured to use, inter alia, the information provided in response to the secondary questions to score a respondent's primary question answer (as described more fully below). The computer system 10 is configured to prompt the respondent to answer a primary question and then to indicate the likely distribution of the possible answers (i.e., the percentage of other respondents who will endorse each of the possible answers). For example, referring to Table 2, with reference to the first question of Table 1, a sample set of secondary questions is shown.

TABLE 2

Sample questions

What percentage of survey-takers do you think will answer (a)?
What percentage of survey-takers do you think will answer (b)?
What percentage of survey-takers do you think will answer (c)?
What percentage of survey-takers do you think will answer (d)?

The server 20, via the computer system 10, is configured to receive responses to each of the primary and secondary questions provided to the respondents. The computer system 10 is configured to receive the responses using a human-interface device such as the display 118 (e.g., using a touch-sensitive monitor), the keyboard 120, the mouse 122, and/or the microphone 126. Alternatively, the respondents can be prompted by the computer system 10 to provide answers using other methods (e.g., printing and mailing a response to the client). A sample dialog is shown in Table 3.

TABLE 3

Sample dialog

| Question | Respondent's Answer |
| --- | --- |
| Will you vote in the next presidential elections? | (b) |
| (a) Definitely | |
| (b) Probably | |
| (c) Probably not | |
| (d) Definitely not | |
| What percentage of survey-takers do you think will answer (a)? | 10% |
| What percentage of survey-takers do you think will answer (b)? | 30% |
| What percentage of survey-takers do you think will answer (c)? | 40% |
| What percentage of survey-takers do you think will answer (d)? | 20% |

The server 20 is configured to score the respondent's primary question answers using a scoring algorithm. The scoring algorithm used by the BTS technique is carried out such that, for example, it is 1) truth-inducing, 2) information rewarding, and 3) universal (e.g., substantially, and possibly totally subject-matter independent and preferably requiring no input from the client except, optionally, the primary and/or secondary questions). For example, it will be in the best interest of each respondent to provide a personally truthful answer, irrespective of whether the respondent believes that the answer is "typical" or "unusual." Using the BTS technique scoring algorithm can enable a client to reward respondents who provide "better" information. The BTS technique scoring algorithm is further designed such that the questions can pertain to any subject matter of interest to the client (e.g., the BTS technique can be used to collect information relating to the respondents' opinions, attitudes, beliefs, preferences, past behaviors, future intentions, and/or demographic characteristics). Using a scoring algorithm that is subject matter independent can help avoid the need to know statistical and/or parametric model information about the possible primary question answers, and can allow the BTS technique to be applied to completely novel questions for which statistical information is unavailable.

For each question presented to a respondent, the server 20 is configured to score the respondent's responses as a function of the respondent's primary and secondary question responses and other respondents' primary and secondary question responses. The server 20 is configured to score both components of the respondent's answer (e.g., the answer to the primary question and the secondary questions). For example, the server 20 is configured to score the primary question answer (e.g., indicating the likelihood that the respondent answered truthfully) and to score the secondary question answers for accuracy (e.g., how well the predicted answer distribution matches the actual distribution). By way of example, and not as a limitation, for each primary/secondary question set completed by each respondent, the server 20 is configured to:

Compute an "information score" for each possible answer to the primary question as a function of 1) the number of respondents that choose a specific primary answer and 2) the predictions that a specific answer will be chosen.

Compute a BTS score indicative of whether the respondent was telling the truth or lying when answering the primary question.

Furthermore, by way of example, and not as a limitation, the server 20 is configured to use a completed survey to:

Calculate a specific respondent's total score as a function of the respondent's scores on individual questions.

Optionally calculate an incentive (e.g., financial) calculation as a function of the respondent's total score.

The server 20 is configured to use the following algorithm to score each answer provided by each respondent. Let n indicate the number of participating respondents, m indicate the number of possible answer to a primary question, and $r, s, q \in \{1, 2, \ldots, n\}$, individual respondents labeled by number (e.g., r, s, and q are separate respondents, each labeled by number). The answer endorsed by respondent r is an integer $x^r \in \{1, \ldots, m\}$, and the prediction made by respondent r is a probability distribution $y^r = (y_1^r, \ldots, y_m^r)$ ($y_k^s > 0$, $\Sigma_k y_k^s = 1$).

The server 20 is configured to calculate an information score for each possible answer of a question according to, Information score for answer k of m possible answers $$\text{Information score for answer } k \text{ of } m \text{ possible answers} = \ln\frac{\bar{x}_k}{\bar{y}_k}, \quad (1)$$

where $\bar{x}_k$ (i.e., the fraction of respondents actually endorsing answer k) is, $$\bar{x}_k = \frac{1}{n}\sum_{r=1}^{n} I(x^r = k), \quad (2)$$

where $\bar{y}_k$, (i.e., the geometric mean of predicted popularity of k) is, $$\bar{y}_k = e\left\{\frac{1}{n}\sum_{r=1}^{n} \ln y_k^r\right\}, \quad (3)$$

and, where $I(\bullet)$ is the zero-one indicator function (e.g., 1 if the condition is satisfied and zero otherwise) and $e\{\bullet\}$ is the exponential function.

The server 20 is configured to calculate a total BTS score corresponding to the primary and secondary answers given by a respondent according to, BTS score for $(x^r=j,y^r)$=(Information score)+$\alpha$(Prediction score), (4)

where $$\text{prediction score of respondent } r = \sum_{k=1}^{m} \bar{x}_k \ln\frac{y_k^r}{\bar{x}_k}, \quad (5)$$

where $0<\alpha\leq 1$, and j is the answer selected by the respondent whose score is being calculated.

The first part of Equation (4) selects a single information-score value as $x_k^r=0$ for answers not endorsed by r. The second portion of Equation (4) can be a penalty proportional to the relative entropy (or Kullback-Leibler divergence) between the empirical distribution and r's prediction of the distribution. For example, the best prediction score is zero and is attained when r's prediction matches reality. The respondent preferably does not know which answer will receive highest information score, nor what will be the actual distribution of primary answers. Equation (4), however, is preferably a mathematical theorem arranged such that a personally truthful answer will maximize the expected information score (e.g., Equation (1)), and that a truthful prediction will maximize the prediction score (e.g., Equation (5)), provided the number of respondents is sufficiently large. That is, the information score is preferably increased (in expectation) by an honest primary answer, and the prediction score is preferably increased (in expectation) by an honest secondary answer, in which $y_k^r = E\{\bar{x}_k|t^r\}$. Furthermore, the constant $\alpha$ fine-tunes the weight given to prediction error.

The value of $\alpha$ can affect how Equation (4) is used. For example, depending on the value of $\alpha$, Equation (4) can be a total payoff equation. If $\alpha<1$, the sum of all the respondents' scores in a population will have a positive total. If $\alpha=1$ then scores across all respondents equal zero (e.g., survey is zero-sum). For example, the scores can be used as a betting pool and/or market, with the total amount won by the high scoring respondents matching the total losses of the low scoring respondents. For smaller values of $\alpha$ the sum of the scores is positive and the survey becomes relatively more cooperative.

While Equation (4) is suitable for large samples (e.g., n>50 when using a question with a binary answer), the truth-rewarding properties of the score computed using Equation (4) may not hold as the number of respondents participating in a survey declines (although in most cases the truth-rewarding properties of the score will hold). In particular, for small populations, there arises the possibility that no respondent will chose a particular answer, which may lead to an infinite score according to equations (4) and (5). Equation (4) can be modified by replacing the empirical percentages with so-called Laplace estimates derived from the empirical percentages, although other modifications are also possible. For example, using the Laplace estimates, the empirical sample is "seeded" with one extra answer for each possible choice. The Laplace modified version of Equation (4), for $n\geq 3$, and for respondent r, is $$\text{Laplace - corrected } BTS \text{ score for } (x^r = j, y^r) = \sum_{s\neq r}\ln\frac{\bar{x}_j^{-rs}}{\bar{y}_j^{-rs}} + \alpha\sum_{s\neq r}\sum_k \bar{x}_k^{-rs}\ln\frac{y_k^r}{\bar{x}_k^{-rs}}, \quad (6)$$

where $$\bar{x}_k^{-rs} = \frac{1}{n+m-2}\left(1+\sum_{q\neq r,s} I(x^q = k)\right), \quad (7)$$

and $$\bar{y}_k^{-rs} = e\left\{\frac{1}{n-2}\sum_{q\neq r,s}\ln y_k^q\right\}. \quad (8)$$

For example, the Laplace-corrected BTS score for respondent r is built up from pairwise comparisons of r against all other respondents q and s. A feature of equations (6), (7), and (8), is that a respondent's primary answer preferably does not count in the score contribution of the respondent's secondary answer (8), and, likewise, the respondent's secondary answer preferably does not count in the information score of the respondent's primary answer (7). This preferably reduces (and possibly eliminates) the possibility that a respondent might hope to benefit by simultaneously providing untruthful primary and secondary answers. The use of Equation (6) can introduce a small distortion in incentives, which can be made to disappear by increasing the number of respondents (i.e., n). Preferably, Equation (6) is used when $n\geq 3$, and more preferably when $n\geq 6$. The system 5 can be configured to use Equation (6) whenever the sample size is below a desired threshold (e.g., 50), and/or or when one or more of the answer choices to a primary question receives no endorsements, although other configurations are possible.

The server 20 is configured to provide a total score for each respondent and to determine, if desired, the appropriate compensation/reward. A respondent's total score is preferably equal to the sum of the respondent's individual scores to each respective question. As a respondent's total score becomes higher, the likelihood that the respondent answered each of the primary questions truthfully increases. Likewise, as the respondent's total score becomes lower, the likelihood that the respondent answered each of the primary questions truthfully decreases. The respondent's compensation can be calculated according to, Compensation=(Flat Rate)+$K$(BTS score), (9)

where the Flat Rate and K can be determined by the client. While Equation (9) has been described as a compensation formula, other compensation formulas can be used. For example, if $\alpha<1$, and the sum of BTS scores across respondents is positive, the client can determine the Flat Rate and K so as to match the client's compensation budget for the survey. Although compensation can be linked to the BTS formula, the formula can also be used as a purely motivational-competitive device with no financial consequence (e.g., like an online game or parlor game). For example, respondents can play the game purely "for fun," and for the psychological satisfaction of doing well or winning (as measured by the BTS scoring formula).

Figure 4:
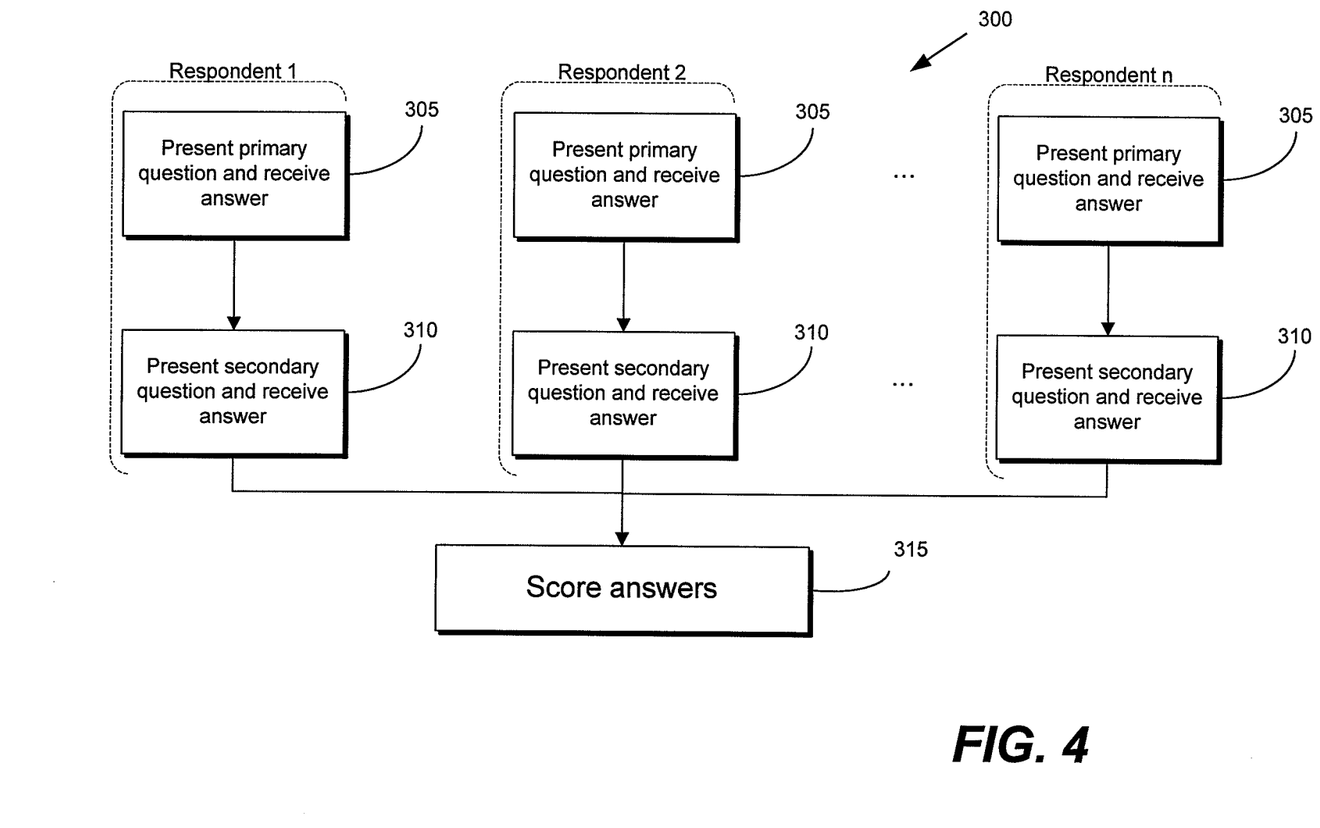
FIG. 4 is a block flow diagram of a process of gathering information from a population.

In operation, referring to FIG. 4, a process 300 for posing a single question set (e.g., a single primary question and corresponding secondary question(s)) to respondents using the BTS technique and the system 5 includes the stages shown. The process 300, however, is exemplary only and not limiting. The process 300 may be altered, e.g., by having stages added, removed, or rearranged. The process 300 preferably involves a client and multiple respondents although other parties can be involved. For example, the client can hire a third party to conduct the survey on its behalf (e.g., to maintain the anonymity of the client). While the process 300 uses the system 5 to conduct the survey, other approaches can be used (e.g., mail, in-person, telephonic, etc). Furthermore, the states 305, 310, and 315 can be repeated if the survey includes multiple primary questions.

At stage 305, a primary question and answer option are presented to, and an answer selection indication received from, each of the respondents participating in the survey. The primary question prompts the respondents to provide an answer indicative of a personally held belief, e.g., "Do you enjoy eating donuts?") The primary question is presented to the respondents using the computer system 10. Different respondents, however, can use different mediums (e.g., one respondent receives the question in an e-mail, another receives it via the web, and yet another receives it via an instant-messaging session). The responses to the primary question can be provided by the respondent using a different medium than that used to provide the question to the respondent. For example, a respondent can receive the primary question via the web, but provide a response by mailing the response to the client. Preferably, the same primary question is presented to each of the respondents simultaneously, however, other configurations are possible (e.g., the order of the primary questions can be randomized, but preferably each respondent answers each primary question prior to completion of the survey).

At stage 310, a secondary question is presented to the respondents using the computer system 10 (although different delivery mechanisms can be used). The secondary question asks each respondent to provide a probability distribution that other respondents endorsed a specific answer, or each of the available answer options. For example, if there are three possible answers to the primary question (e.g., a, b, and c) then each respondent estimates how many other respondents (e.g., in percentage points) will pick each of the respective answers. The system 5 determines if the responses to the secondary question total 100%. If the total to the secondary question does not total 100% the system 5 prompts the respondent (e.g., by providing an error message to the respondent) to take corrective action. As with the primary question, the media used to provide the question to and receive an answer from a respondent can vary.

At stage 315, the server 20 receives the answers to the primary and secondary questions from each of the respondents participating in the survey and calculates one or more scores. For each possible answer to the primary question posed to the respondents, the server 20 calculates an information score using Equation (1). For each respondent's answers to the primary and secondary questions, the server 20 calculates a BTS score using Equation (4). If, however, the number of total respondents is small (e.g. less than 50 respondents), then the server 20 calculates a BTS score for each respondent's primary answer using Equation (6). Alternatively, the system 5 can be configured to determine if any of the possible answers received no endorsements, and use either Equation (4) or (6) accordingly (e.g., using Equation (6) if at least one of the answer choices received no endorsements). The server 20 uses a value for a that is provided by the client.

Figure 5:
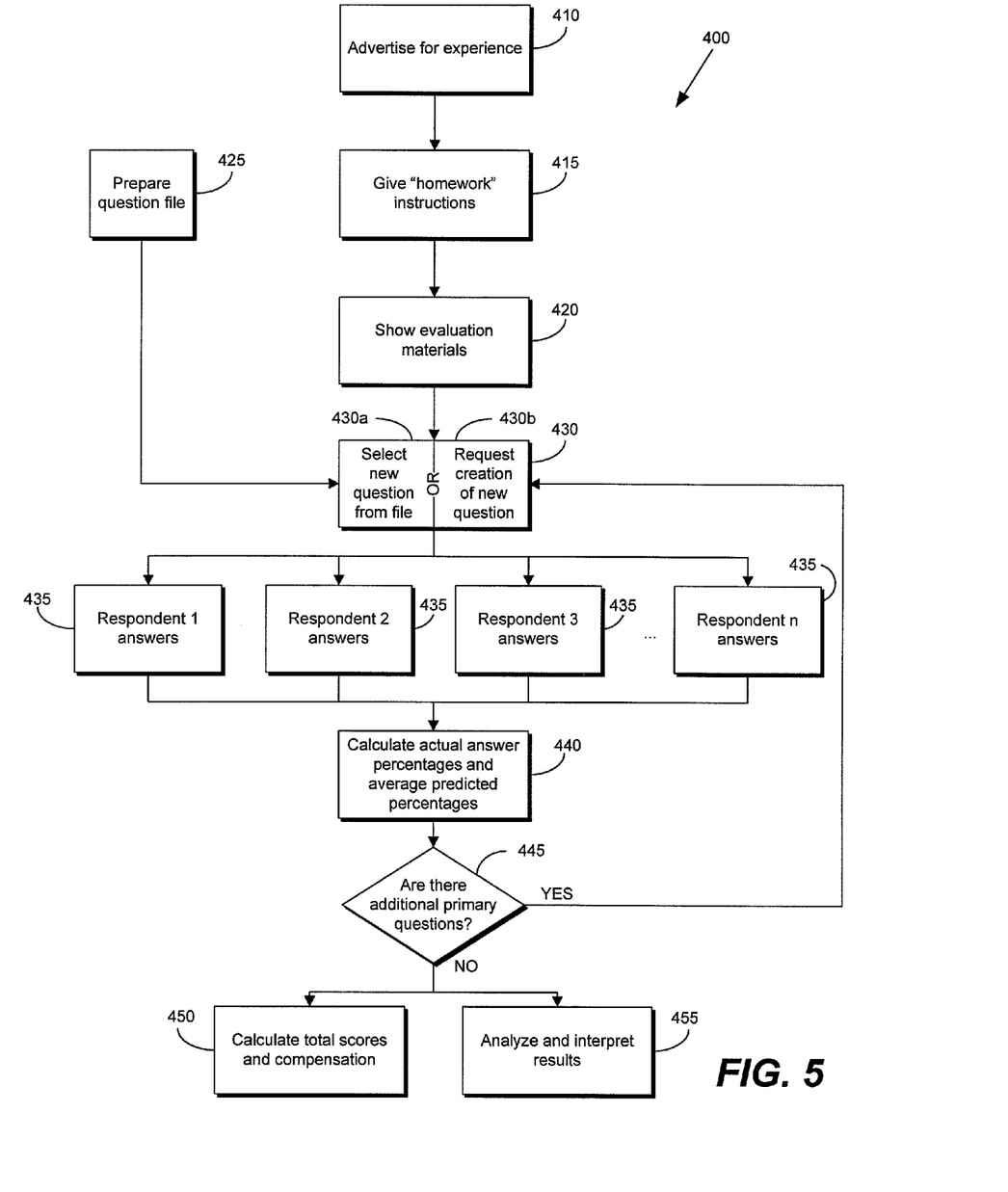
FIG. 5 is a block flow diagram of a process of gathering information from a population.

In operation, referring to FIG. 5, with further reference to FIGS. 1 and 2, a process 400 for preparing and taking a survey, determining BTS scores, and evaluating results includes the stages shown. The process 400, however, is exemplary only and not limiting. The process 400 may be altered, e.g., by having stages added, removed, or rearranged. The process 400 preferably involves a client and multiple respondents although other parties can be involved. For example, the client can hire a third party to conduct the survey on its behalf. While the process 400 uses the system 5 to conduct the survey, other approaches can be used.

The process 400 can be implemented non-interactively or interactively. In the non-interactive variant, the survey uses predetermined questions listed on a sheet of paper or a computer screen. In the interactive variant, questions can be created by the respondents themselves, or by the client during the course of the survey. The interactive variant can follow a relatively free discussion of a topic. For example, the discussion is structured so that respondents can pose and answer each other's questions. The flow of discussion can have some resemblance to a parlor game, in that there can be an element of "challenge" and that each respondent accumulates a personal score. In essence, one can get credit for presenting statements 1) that are not redundant of what has previously been said, and 2) that are recognized as relevant by the others.

At stage 410, the client advertises for a specialized group of respondents, e.g., respondents that have a special expertise or background such as doctors who may prescribe a specific kind of drug. The advertisement can explain the competitive aspect of the survey process and can indicate that respondents who have relevant expertise have a competitive advantage and may receive extra compensation. If the client does not desire a specialized group of respondents, the client can omit stage 410.

At stage 415, respondents participating in the survey are given an advance preparation assignment. For example, the respondents are told to use a specific product, try a specific service, interview friends or household members about a topic, learn the rules of a game, and/or think about a game strategy. The client can indicate that respondents who conscientiously fulfill the preparation assignment can have an advantage in the survey and may receive extra compensation. In the interactive variant, the respondents can be asked to prepare questions to provide during the course of the survey. If the client does not desire that the respondents prepare for the survey, stage 415 can be omitted.

At stage 420, prior to answering survey questions, the respondents can be provided with evaluation materials. The evaluation materials preferably relate to the subject matter of the survey. For example, the evaluation materials can be new products that the client is contemplating selling. The evaluation materials need not be provided before answering survey questions, and need not be provided at all.

At stage 425, if desired, the client prepares a question file (e.g., a questionnaire and/or a computer file containing questions) that includes one or more primary questions. In the interactive variant, the respondents can create most or all of the questions. The client, however, can prepare some questions that are introduced during the course of the survey. The question file is stored in the database 25, although other storage locations are possible. The process proceeds to stage 430a if the survey is non-interactive, and proceeds to stage 430b otherwise.

At stage 430, a primary question is selected for presentation to the respondents, and a corresponding secondary question is posed. At stage 430a, the server 20 selects a question from the question file stored in the database 25 and provides the question to the respondent. During stage 430b, the server 20 either retrieves a question from the question file stored in the database 25, or requests the respondents participating in the survey to create a new question. Preferably, at some point prior to providing the questions to the respondents, the server 20 posts a notice informing the respondents that the entire survey population will receive the same questions. For example, in the interactive version, the respondents are preferably notified that all respondents are receiving the same question simultaneously. Likewise, in the non-interactive version, the respondents are preferably told that the entire survey population will receive the same questions.

During stage 430b, respondents can be motivated to formulate question that capture insight not obvious to all other respondents. For example, questions having an answer that is common knowledge to the survey population preferably yield scores of zero (e.g., because everyone will agree on a single answer, and everyone will correctly predict that everyone will agree). Thus, respondents can be motivated to formulate, for example, challenging and creative questions that, preferably, do not have obvious answers.

Figure 6:
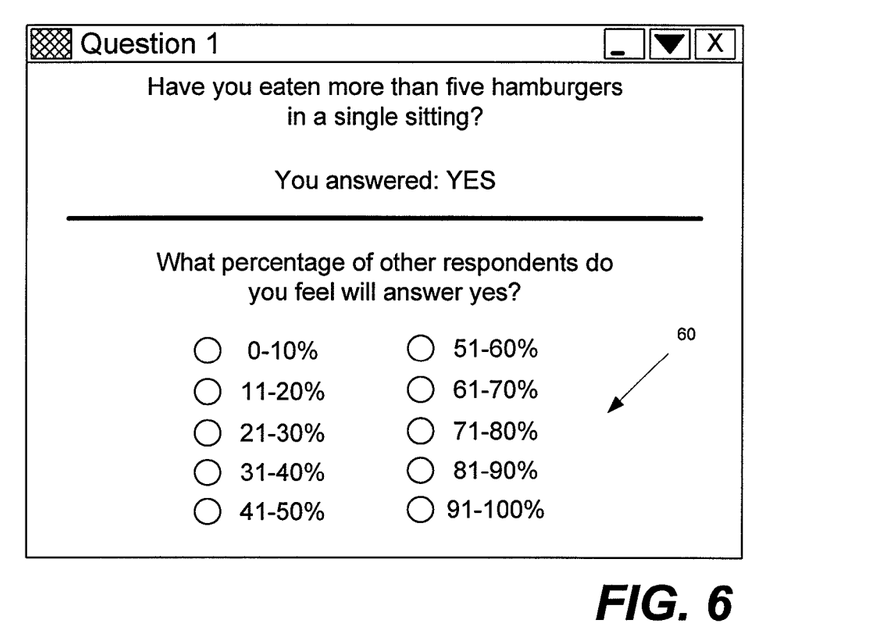
FIG. 6 is a screen shot of a secondary question being presented to a respondent.
Figure 7:
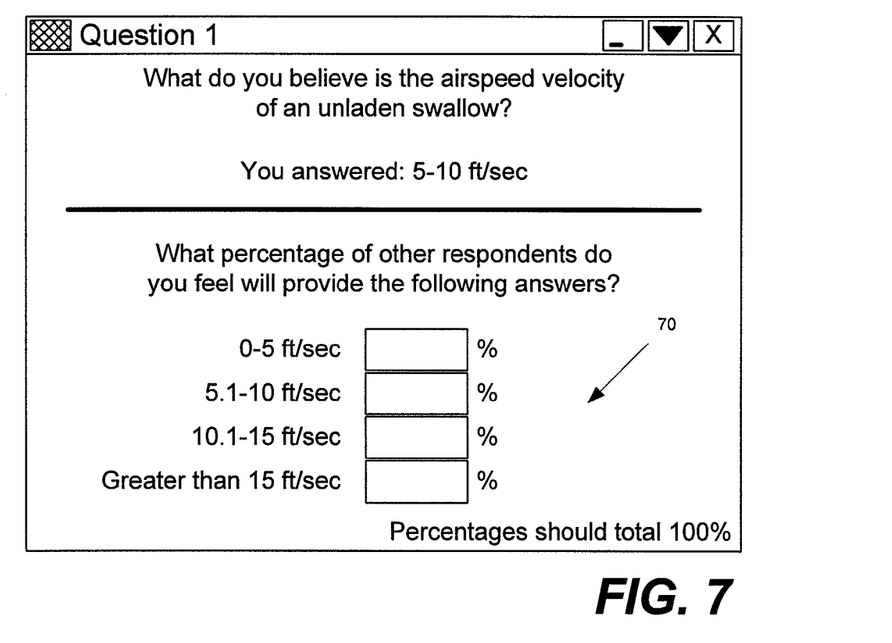
FIG. 7 is a screen shot of a secondary question being presented to a respondent.

At stage 435, each of the respondents (e.g., respondents 1 through n) provides at least two pieces of information to the sever 20. First, each respondent personally endorses one of the possible answers to the primary question. Second, each respondent responds to the secondary question by estimating the percentage of other respondents that will endorse each of the possible answers to the primary question. The method by which respondents provide the esimtates can vary. For example, for dichotomous questions (e.g., Yes/No questions), the respondents can be given a discrete scale 60 as shown in FIG. 6, here in 10% increments. Alternatively, e.g., when there are many possible answers, the respondents can be asked to enter the percentages numerically in a window set 70 corresponding to the primary answer options as shown in FIG. 7. In the latter, to reduce the respondents' burden, the respondents can be told that their percentages will be adjusted (e.g., normalized) to make sure that they sum up to one hundred. At stage 440, the server 20 receives the responses provided by the respondents.

The server 20 calculates an information score for each possible answer to the primary question according to Equation (1). The server, for each respondent, calculates a BTS score of the respondent's answer using Equation (4). If however, the number of respondents is smaller than, for example, 50, the server 20 calculates the BTS score using Equation (6). The server 20, depending on, for example, whether the survey is interactive or non-interactive, posts the scores calculated during stage 440 for all of the respondents to see. Posting of the scoring information can cause the respondents to tap into non-redundant information (e.g., information that was not revealed by answers to previous questions) when answering subsequent primary questions.

The client can use the information score corresponding to a particular respondent's primary answer to obtain information about the likelihood that the respondent answered the question truthfully. For example, if the respondent answered carelessly and/or lied when answering the primary question, there is a higher likelihood that the corresponding information score is smaller than it otherwise would have been if the respondent told the truth. A client can use the information scores of the respondents to, for example, identify individual respondents that are more likely providing truthful answers, e.g., by identifying the top-ten scores in a population of respondents. Furthermore, the client can preferably also use the information score to identify respondents having superior information, and/or possessing special expertise for the domain.

At stage 445, the server determines if additional questions should be asked. If there are additional questions to ask, the process 400 returns to stage 430, otherwise the process 400 continues to stages 450 and 455.

At stage 450, the server 20 calculates total scores for each of the respondents. The server 20 calculates a specific respondent's total score by adding up the BTS score of each primary question answered by the specific respondent. The server 20 also calculates, if desired, compensation to be awarded to each of the respondents according to Equation (9). The client can adjust "feel" of the survey by adjusting $\alpha$ and the Flat Rate. For example, if Flat Rate=0, and $\alpha$=1, the survey can resemble a betting pool (e.g., the monetary budget is zeroed-out at the completion of the survey). Using a survey that resembles a betting pool can increase the quality of the information obtained by the survey. For example, rational respondents may be more likely to bet if they believe that they have superior information.

At stage 455, the server 20 delivers the information obtained during the survey to the client and/or analyzes the gathered information. The server 20 can analyze the information using a statistical and/or other methodology appropriate for the objectives of the study.

The BTS technique can create incentives at several stages for respondents to provide high quality, truthful answers. For example, at stage 410, if the client advertises that desired respondents will likely get better rewards, then individuals having the desired specialized expertise or background can expect to score well in the survey and be rewarded accordingly, thus providing an additional incentive to participate (e.g., thereby preferably increasing the proportion of expert respondents in a survey population and/or improving the relevance and/or quality of the collected information). At stage 415, if the client requests advance preparation for the survey and indicates that fully-prepared respondents can expect to receive a better reward, then respondents that have fully prepared are preferably more likely to receive a high survey score, which can increase the likelihood that respondents will more fully prepare. At stage 435 respondents who know that truthful answers are more likely to yield a higher score can be motivated to provide truthful answers to the primary and secondary questions by the desire to obtain a high score. At stage 440, posting feedback about respondents' scores can increase excitement among respondents and a motivation to do well.

Example 1

One sub-category of surveys determines one or more probabilistic estimates of the likelihood of future events, such as the probability that prices or interest rates will reach a certain level, probability of success of new technologies or products, probabilities assigned to political events, or environmental scenarios (e.g., global warming), etc. To obtain better estimates of the likelihood of future events, clients preferably use expert respondents (e.g., because the estimates are typically honest, and reflect appropriate preparation, including research).

Once the relevant outcome (e.g., the future event) occurs, the client can reward honest estimates using, for example, one of two approaches:
 (i) Proper scoring rules: Respondents state probabilities that an event will or will not occur. After it is known whether the event did or did not occur, respondents are paid according to a score calculated using a truth-revealing mathematical function (e.g., as described above). Truth-inducing here means that before the event is known, an expert maximizes the expert's expected returns (e.g., score) by stating honest probabilities.
 (ii) Electronic futures markets and/or prediction markets: Respondents buy shares that pay off in the case that a particular event occurs (e.g., if a certain candidate wins a presidential election).

As Equations (1)-(8) preferably do not rely on external events, other than the judgments made by the respondents, truth-inducing scores can be computed before the event in question takes place. Thus, the BTS technique has many applications, including:
 (1) To elicit honest probabilistic judgments about the truth-value of any clearly stated proposition, even if the proposition pertains to events in the remote future or to events in the past, whose truth may never be conclusively demonstrated, and therefore methods such as proper scoring rules and/or prediction markets typically cannot be used. Examples include expert forecasts of remote catastrophic events (e.g., nuclear war by year 3,000), historical inferences, and/or classification of archeological artifacts.
 (2) To evaluate qualitative judgments, such as aesthetic judgments, or cultural (e.g., artistic or legal) interpretations.

Example 2

As an example, and not as a limitation, Table 4 shows a comparison of exemplary embodiments of the BTS technique as compared to focus groups, surveys, and/or electronic markets.

TABLE 4

|  | Focus Groups | Surveys (paper or electronic) | Electronic Markets | Bayesian Truth Serum Method |
| --- | --- | --- | --- | --- |
| Allows for interaction | Yes | No | Yes | Yes (using interactive variant) |
| Requires client to specify questions in advance | No | Yes | Yes | No |
| Payment contingent on performance | No | No | Yes | Yes |
| Rewards superior information | No | No | Yes | Yes |
| Richness of elicited information | High | High | Low | High |
| Does not require a public event (aside from answers) to calculate compensation | — | — | No | Yes |

Example 3

The primary questions can be adapted to address situations where respondents have a priori knowledge about an answer distribution of a primary question and/or situations in which different respondents each choose the same primary question answer for different reasons.

Having a priori knowledge of a primary question's answer distribution can affect a respondent's score. For example, a respondent's knowledge that the respondent is male may not have an impact on the respondent's judgment of the proportion of men and women in the population (e.g., if the respondent knows the distribution a priori). Thus, the probability distribution provided by the respondent, and resulting score is no longer a function of a truthful answer by the respondent to the primary question. The primary questions, however, can be formulated to compensate for a priori knowledge about the answer distribution by combining a characteristic question (e.g., Are you male?) with an opinion question that interacts with gender (e.g., a question about personal tastes in literature or film, which plausibly interacts with gender).

The primary questions can also be adapted to compensate for respondents who choose the same primary question answer for different reasons, such as having different tastes and/or characteristics. For example, a respondent with non-standard political views might treat the respondent's own endorsement of a particular candidate as evidence that most other respondents will prefer someone else. The primary questions, however, can be formulated to compensate for the respondent's different tastes and/or characteristics by combining an opinion question (e.g., Do you think this piece of art is original?) and a characteristic question (e.g., What is your level of expertise regarding art?).

A survey regarding an art evaluation can be used as an example of how the primary questions can be adapted. A survey population includes experts and non-experts who are asked whether a particular piece of art is "original." An art expert will recognize original artwork more accurately than a non-expert does, and the non-expert can have a higher likelihood of enjoying a derivative artwork than original artwork. Referring to Table 5, the fraction of experts is common knowledge, as are the other probabilities. In a short version of a survey, respondents are asked only to state their opinion as to whether the art is original. In the long version, each of the respondents is also asked to indicate a personal level of expertise. Table 5 displays expected information scores for possible answers as a function of opinion and expertise of the respondents, preferably calculated by treating a person's expertise level and opinion as a statistical signal drawn from a known joint probability distribution over all possible signals (e.g., given by the probabilities in the first two columns, and assuming that 25% of the sample are Experts and that there is a 25% chance that the exhibition represents an original artist, a priori), and applying Bayes' rule. With the short version, truth-telling is preferably optimal for experts but not for non-experts, who can have a slight incentive to deceive if the artwork was enjoyed. With the long version, however, the diagonal, truth-telling entries have highest expected score. In particular, respondents can achieve a higher score by revealing personal expertise even though the distribution of expertise in the surveyed population is common knowledge.

TABLE 5

| | | Probability of opinion conditional on true quality of exhibition | | Expected score for reported opinion and expertise level LONG VERSION | | | | SHORT VERSION | |
|---|---|---|---|---|---|---|---|---|---|
| | | | | Expert claims | Expert claims | Non-expert claims | Non-expert claims | | |
| | | If original | If derivative | Like | Dislike | Like | Dislike | Like | Dislike |
| Expert opinion | Like | 70% | 10% | +575 | −776 | −462 | +67 | +191 | −57 |
| | Dislike | 30% | 90% | −934 | +95 | +84 | −24 | −86 | +18 |
| Non-expert opinion | Like | 10% | 20% | −826 | +32 | +45 | −18 | −66 | +12 |
| | Dislike | 90% | 80% | −499 | −156 | −73 | +2 | −6 | −4 |

Expected information scores in the present example preferably reflect the amount of information associated with a particular opinion and/or characteristic. In Table 5, experts can have an advantage even though the experts comprise a minority of the survey population (e.g., because the expert's opinion is more informative about population frequencies).

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A method implemented using a computer of gathering information from respondents using a survey, the method comprising:

posing a primary question to the respondents using the survey;

receiving primary question answers from the respondents using the survey;

posing a secondary question to at least a sub-portion of the respondents using the survey, the secondary question corresponding to the primary question and prompting each of the respondents to provide a prediction indicative of a distribution of responses to the primary question by the other respondents;

receiving secondary question answers from the respondents using the survey; and scoring, using the survey and a computer, a primary question answer received from a selected respondent as a function of i) the primary question answer received from the selected respondent and ii) answers to the primary and secondary questions received from the respondents.

2. The method of claim 1 wherein the primary question includes a plurality of answer choices.

3. The method of claim 2 wherein the secondary question prompts the respondents to provide a prediction indicative a percentage of the respondents that will choose each of the plurality of answer choices.

4. The method of claim 2 further comprising scoring the prediction for accuracy compared to the actual distribution using the computer.

5. The method of claim 2 wherein scoring the primary question answer includes computing an information score corresponding to each of the plurality of answer choices according to $$\ln\frac{\bar{x}_k}{\bar{y}_k}, \text{ where } \bar{x}_k = \frac{1}{n}\sum_{r=1}^{n} I(x^r = k), \text{ where } \bar{y}_k = e\left\{\frac{1}{n}\sum_{r=1}^{n} \ln y_k^r\right\},$$

and where n is a quantity of the respondents, k is an integer representative of a selected one of the answer choices, m is a quantity of the plurality of answer choices, $r \in \{1, 2, \ldots, n\}$ and are individual respondents labeled by number, $x^r \in \{1, \ldots, m\}$ is the primary question answer endorsed by respondent r, and $y^r = (y_1^r, \ldots, y_m^r)$, $(y_k^s \geq 0, \Sigma_k y_k^s = 1)$ is the secondary question answer of respondent r, and $I(\bullet)$ is a zero-one indicator function indicative of whether a condition is satisfied.

6. The method of claim 5 further comprising calculating a combined primary and secondary answer score corresponding to the selected respondent's primary and secondary question answers according to $$\left(\ln\frac{\bar{x}_j}{\bar{y}_j}\right) + \alpha\left(\sum_{k=1}^{m} \bar{x}_k \ln\frac{y_k^r}{\bar{x}_k}\right),$$

where $(x^r = j, y^r)$, $0 \leq \alpha \leq 1$, and j is indicative of which one of the plurality of answer choices is chosen by the selected respondent.

7. The method of claim 5 wherein scoring the primary answer further includes calculating a combined primary and secondary answer score corresponding to the selected respondent's primary question answer according to $$\sum_{s \neq r} \ln\frac{\bar{x}_j^{-rs}}{\bar{y}_j^{-rs}} + \alpha\sum_{s \neq r}\sum_{k} \bar{x}_k^{-rs} \ln\frac{y_k^r}{\bar{x}_k^{-rs}}, \text{ where}$$

$$\bar{x}_k^{-rs} = \frac{1}{n+m-2}\left(1 + \sum_{q \neq r,s} I(x^q = k)\right), \text{ where}$$

$$\bar{y}_k^{-rs} = e\left\{\frac{1}{n-2}\sum_{q \neq r,s} \ln y_k^q\right\}, \text{ where } 0 \leq \alpha \leq 1.$$

8. The method of claim 7 wherein the combined primary and secondary answer score is calculated using $$\sum_{s \neq r} \ln\frac{\bar{x}_j^{-rs}}{\bar{y}_j^{-rs}} + \alpha\sum_{s \neq r}\sum_{k} \bar{x}_k^{-rs} \ln\frac{y_k^r}{\bar{x}_k^{-rs}}$$

only if a quantity of the respondents is less than a threshold.

9. The method of claim 7 wherein the combined primary and secondary answer score is calculated using $$\sum_{s \neq r} \ln \frac{\overline{x}_j^{-rs}}{\overline{y}_j^{-rs}} + \alpha \sum_{s \neq r} \sum_k \overline{x}_k^{-rs} \ln \frac{y_k^r}{\overline{x}_k^{-rs}}$$

only if none of the respondents selected at least one of the answer choices.

10. The method of claim 1 wherein scoring the primary question answer includes using a truth-assessing scoring algorithm.

11. The method of claim 1 wherein the primary question is authored by another respondent.

12. A non-transitory computer program product residing on a non-transitory computer-readable medium and comprising computer-readable instructions that, when executed by a computer, cause the computer to:
 pose a primary question to respondents using a survey;
 receive primary question answers from the respondents;
 pose a secondary question to at least a sub-portion of the respondents using a survey, the secondary question corresponding to the primary question and prompting each of the respondents to provide a prediction indicative of a distribution of responses to the primary question by the other respondents;
 receive secondary question answers from the respondents; and
 score a primary question answer received from a selected respondent using a computer and as a function of i) the primary question answer received from the selected respondent and ii) answers to the primary and secondary questions received from the respondents.

13. The non-transitory computer program product of claim 12 wherein the primary question includes a plurality of answer choices.

14. The non-transitory computer program product of claim 13 wherein the secondary question prompts the respondents to provide a prediction indicative a percentage of respondents that will choose each of the plurality of answer choices.

15. The non-transitory computer program product of claim 13 wherein the computer-readable instructions further cause the computer to score the prediction for accuracy.

16. The non-transitory computer program product of claim 13 wherein the computer-readable instructions further cause the computer to compute an information score corresponding to each of the plurality of answer choices according to $$\ln \frac{\overline{x}_k}{\overline{y}_k}, \text{ where } \overline{x}_k = \frac{1}{n} \sum_{r=1}^n I(x^r = k), \text{ where } \overline{y}_k = e\left\{\frac{1}{n}\sum_{r=1}^n \ln y_k^r\right\},$$

and where n is a quantity of the respondents, k is an integer representative of a selected one of the answer choices, m is a quantity of the plurality of answer choices, $r \in \{1, 2, \ldots, n\}$ are individual respondents labeled by number, $x^r \in \{1, \ldots, m\}$ is the primary answer endorsed by respondent r, and $y^r = (y_1^r, \ldots, y_m^r)$ is the secondary question answer of respondent r, $(y_k^s > 0, \Sigma_k y_k^s = 1)$, and $I(\cdot)$ is a zero-one indicator function indicative of whether a condition is satisfied.

17. The non-transitory computer program product of claim 12 wherein the computer-readable instructions further cause the computer to compute a combined primary and secondary answer score according to $$\left(\ln \frac{\overline{x}_j}{\overline{y}_j}\right) + \alpha \left(\sum_{k=1}^m \overline{x}_k \ln \frac{y_k^r}{\overline{x}_k}\right),$$

where $(x^r = j, y^r)$, $0 \leq \alpha \leq 1$, and j is indicative of which one of the plurality of answer choices is chosen by the selected respondent.

18. The non-transitory computer program product of claim 12 wherein the computer-readable instructions further cause the computer to compute an information score corresponding to each of the plurality of answer choices according to $$\sum_{s \neq r} \ln \frac{\overline{x}_j^{-rs}}{\overline{y}_j^{-rs}}, \text{ where } \overline{x}_k^{-rs} = \frac{1}{n+m-2}\left(1 + \sum_{q \neq r, s} I(x^q = k)\right),$$

$$\text{where, } \overline{y}_k^{-rs} = e\left\{\frac{1}{n-2}\sum_{q \neq r, s} \ln y_k^q\right\}, \text{ where } 0 \leq \alpha \leq 1.$$

19. The non-transitory computer program product of claim 17 wherein the computer-readable instructions further cause the computer to compute the combined primary and secondary answer score using $$\sum_{s \neq r} \ln \frac{\overline{x}_j^{-rs}}{\overline{y}_j^{-rs}} + \alpha \sum_{s \neq r} \sum_k \overline{x}_k^{-rs} \ln \frac{y_k^r}{\overline{x}_k^{-rs}}$$

only if a quantity of the respondents is less than a threshold.

20. The non-transitory computer program product of claim 17 wherein the computer-readable instructions further cause the computer to compute the combined primary and secondary answer score using $$\sum_{s \neq r} \ln \frac{\overline{x}_j^{-rs}}{\overline{y}_j^{-rs}} + \alpha \sum_{s \neq r} \sum_k \overline{x}_k^{-rs} \ln \frac{y_k^r}{\overline{x}_k^{-rs}}$$

only if none of the respondents selected at least one of the answer choices.

21. The non-transitory computer program product of claim 12 wherein the computer-readable instructions further cause the computer to score the primary question answer using a truth-assessing scoring algorithm.

22. The non-transitory computer program product of claim 12 wherein the computer-readable instructions further cause the computer to prompt another of the respondents to author the primary question.

23. A questionnaire for use with a population of respondents, the questionnaire comprising:
 a question set comprising:
  a primary question portion containing a primary question;
  a primary question answer portion including a plurality of answer choices to the primary question;
  a secondary question portion containing a secondary question corresponding to the primary question; and
  a secondary question answer portion,
 wherein the secondary question prompts a respondent to provide a distribution estimation of how other respondents in the population will answer the primary question.

24. The questionnaire of claim 23 further comprising means for scoring an answer provided by the respondent in response to the primary question.

25. The method of claim 1, wherein the questionnaire is a computerized questionnaire.

* * * * *